S. D. MASTER.
CUSHION TIRE.
APPLICATION FILED APR. 1, 1919.

1,367,824.

Patented Feb. 8, 1921.
3 SHEETS—SHEET 1.

Witnesses
Edwin F. McKee

Inventor
S. D. Master
By Victor J. Evans
Attorney

S. D. MASTER.
CUSHION TIRE.
APPLICATION FILED APR. 1, 1919.
1,367,824.
Patented Feb. 8, 1921.
3 SHEETS—SHEET 2.
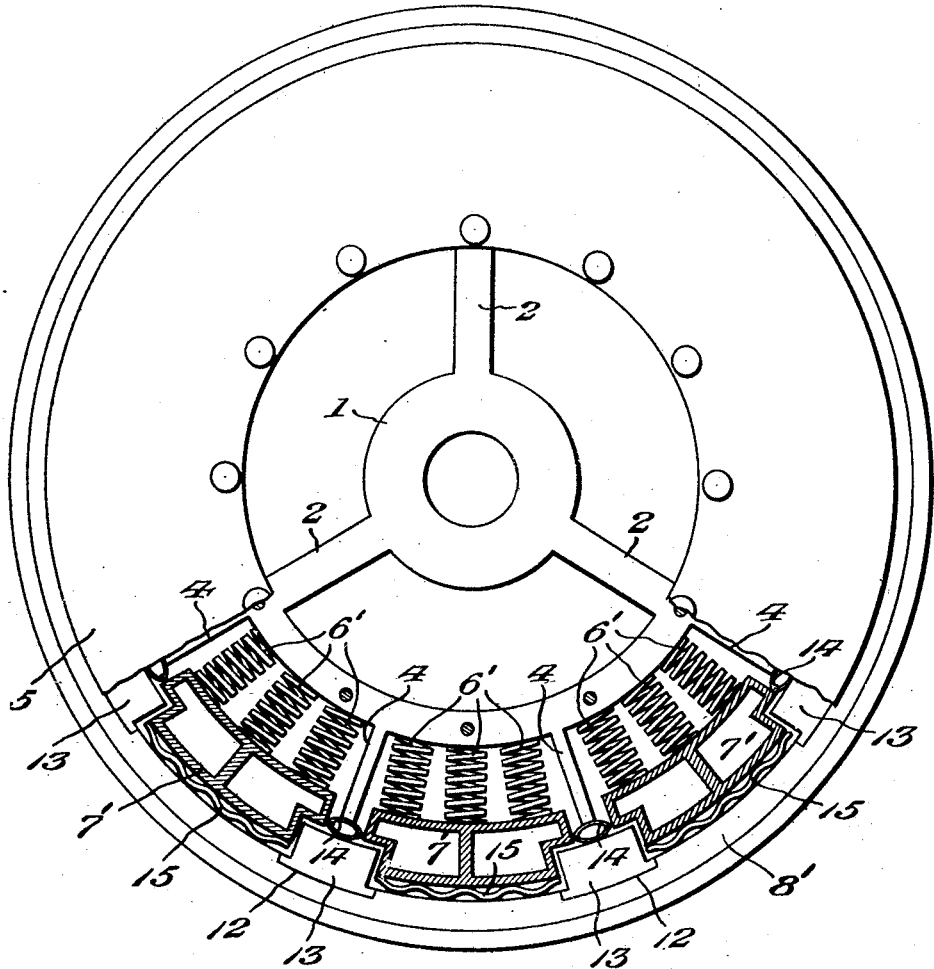
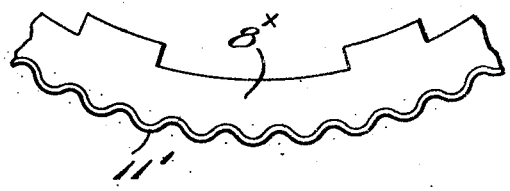
Witnesses
Edwin F. McKee
Inventor
S. D. Master
By Victor J. Evans
Attorney

UNITED STATES PATENT OFFICE.

SHAVUKSHA D. MASTER, OF BOMBAY, INDIA.

CUSHION-TIRE.

1,367,824.     Specification of Letters Patent.     Patented Feb. 8, 1921.

Application filed April 1, 1919. Serial No. 286,695.

*To all whom it may concern:*

Be it known that I, SHAVUKSHA D. MASTER, a subject of the King of Great Britain, residing at Bombay, India, have invented new and useful Improvements in Cushion-Tires, of which the following is a specification.

This invention relates to a novel construction of a spring wheel and the principal object of the invention is to provide a floating outer rim or tire with spring means interposed between the same and an inner rim.

Another object of the invention is to provide a series of chambers in the space between the rims, in which chambers the spring means are located, and to arrange movable blocks or pistons in the outer ends of the chambers, said blocks having their inner sides engaged by the spring means and their outer sides engaged by the outer rim or by a part interposed between the rim and blocks.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Fig. 3 is a view similar to Fig. 1 but showing a modification.

Fig. 4 is a detail view of another modification.

Figure 1:
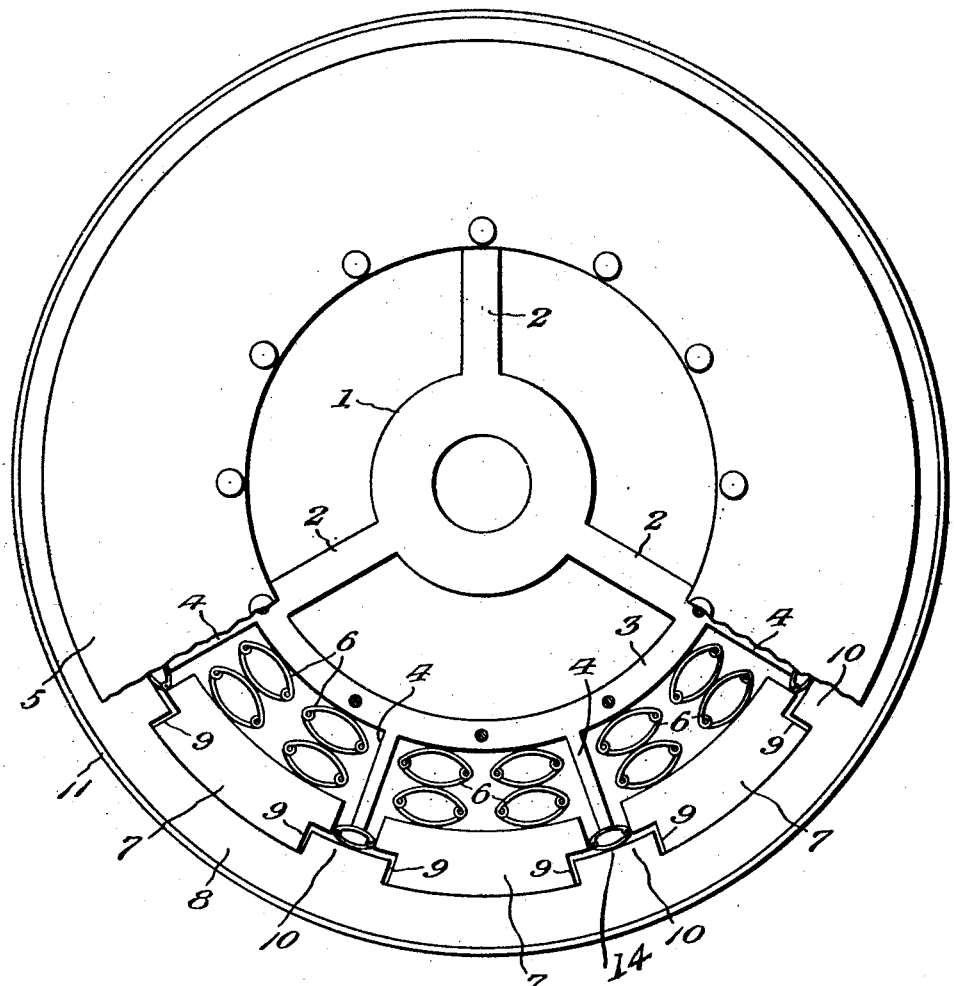
Figure 1 is a side view of a wheel made in accordance with this invention parts being shown broken away.
Figure 2:
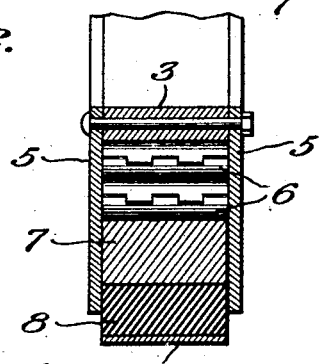
Fig. 2 is a transverse sectional view of Fig. 1.

In these drawings, 1 indicates the hub of the wheel having the spokes 2 radiating therefrom and supporting the rim 3. These parts are preferably formed of metal and may be cast in one piece or formed separately. The rim carries transverse plates 4, which extend outwardly therefrom and are spaced apart around the circumference of the rim to form chambers. The sides of these chambers are formed by the ring-shape plates 5, which are suitably supported and abut the ends of the plates 4 and the rim 3. In the form of the invention shown in Figs. 1 and 2 elliptical springs 6 are placed in each chamber. As shown two pairs of these springs are used in each chamber, but it will be understood that either more or less may be used, if desired. The springs of each pair are arranged to engage each other and the inner springs are arranged to contact with the rim 3 when the wheel is under strain. The outer springs are adapted to be engaged by a piston or block 7 slidingly mounted in the end of each chamber. As shown, this block is made of wood, though I do not wish to be limited in this respect. A rim 8, preferably made of rubber, encircles the blocks with its inner periphery engaging the outer faces of said blocks. As shown, these blocks are of arc shape and their ends, on their outer faces are provided with recesses 9, which receive inwardly extending ribs 10, formed on the rubber rim. These ribs are so located as to lie opposite the ends of the plates 4, though at a considerable distance from the ends of these plates. These ribs are made wide enough so that each rib will engage a recess in a block in one chamber and a recess in the block in the adjacent chamber. The springs may be loosely placed in the chambers, being of such a size as to prevent too much movement or said springs may be suitably connected together and to the rim 3 and piston 7.

The rubber rim 8 may be provided with a thin metal tire 11, or a tire of greater thickness when the wheels are to be used on trucks.

In the modification shown in Fig. 3 the springs 6 are replaced by the coil springs 6' and instead of making the blocks or pistons of wood said parts are made of metal and are hollow as shown at 7'. In this figure, the rim 8' is provided with the recesses 12 to receive the blocks 13, which are suitably secured therein. These blocks take the place of the ribs 10. I sometimes find it desirable to place small springs 14 between the inner faces of the ribs or blocks and the ends of the plates 4, so as to prevent the ends of the plates 4 from contacting with said ribs or blocks.

I may place corrugated or plain elastic strips 15 between the pistons or blocks and the rubber rim.

As shown in Fig. 4 I may replace the plain tire 11 by a corrugated tire 11', the corrugations in which engage corrugations in the rubber rim 8ˣ.

Figure 5:
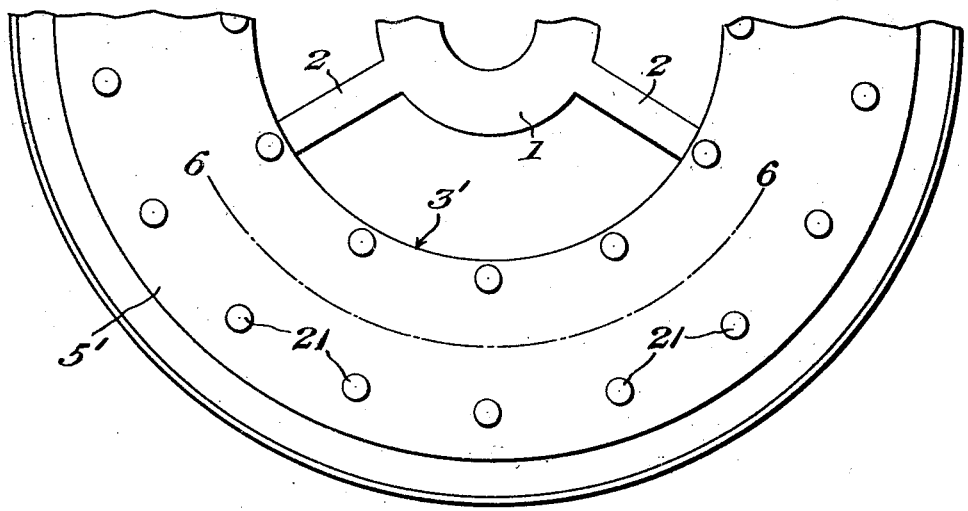
Fig. 5 is a fragmentary side elevation showing another modification.
Figure 6:
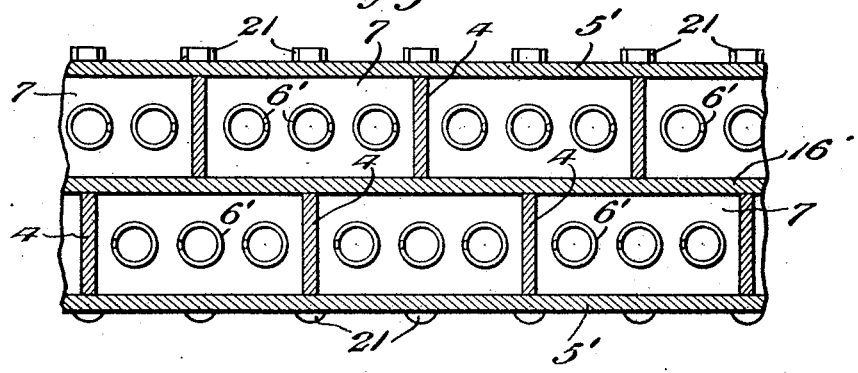
Fig. 6 is a section on line 6—6 of Fig. 5.
Figure 7:
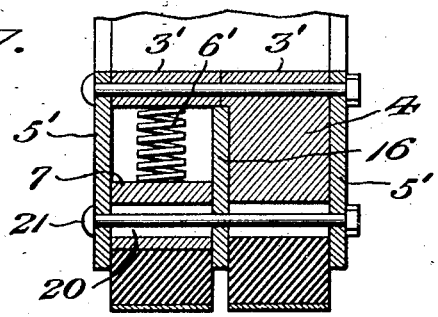
Fig. 7 is a cross sectional view of the form shown in Fig. 5.

In the modification shown in Figs. 5, 6 and 7 the chambers are divided circumferentially by the ring-shape partition plate 16, so that the wheel is provided with two sets of circumferentially arranged chambers, the chambers in one set being alternately arranged with the chambers of the other set, and each chamber of both sets being provided with springs and pistons, as before described. It will, of course, be understood that in this construction the wheel is provided with a pair of rims and tires.

In these figures the side plates 5' are shown as being secured to the inner rims 3' and the pistons or blocks are provided with slots 20 through which bolts 21 pass for movably holding said pistons or blocks to said side plates.

It will thus be seen that as the wheel rotates the portion of the rubber rim in contact with the ground will force the blocks or pistons inwardly against the springs, so that the shocks and jars will be absorbed by said springs.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having described my invention, what I claim is:

1. A wheel of the class described comprising a hub, an inner rim connected therewith, an outer rim surrounding the inner rim and spaced therefrom, radial and transverse partition plates carried by said inner rim and extending into the space between the rims to divide the same into chambers, ribs carried by the outer rim and extending toward the outer ends of the partition plates, springs located between the ribs and the ends of the plates and spring means in the chambers.

2. A wheel of the class described comprising a hub, an inner rim connected therewith, an outer rim surrounding the inner rim and spaced therefrom, radially and transversely arranged partition plates carried by said inner rim and extending into the space between the rims to divide the same into chambers, springs arranged in said chambers, segmental piston blocks also arranged in said chambers and engaging the springs, each block having a recess formed in each end of its outer face and ribs carried by the outer rim and having portions engaging said recesses.

3. A wheel of the class described comprising a hub, an inner rim connected therewith, an outer rim surrounding the inner rim and spaced therefrom, partition plates carried by said inner rim and extending into the space between the rims to divide the same into chambers, springs in said chambers, detached piston blocks also located in said chambers and engaging the springs and elastic strips located between the piston blocks and the outer rim.

In testimony whereof I affix my signature.

SHAVUKSHA D. MASTER.